United States Patent [19]

Inaba et al.

[11] Patent Number: 4,471,279

[45] Date of Patent: Sep. 11, 1984

[54] NUMERICAL CONTROL APPARATUS FOR MACHINE TOOLS

[75] Inventors: Hajimu Inaba, Hino; Yukio Ono, Yokohama; Mitsuo Hiraizumi, Hachioji, all of Japan

[73] Assignee: Fujitsu Fanuc Limited, Tokyo, Japan

[21] Appl. No.: 395,014

[22] PCT Filed: Oct. 29, 1981

[86] PCT No.: PCT/JP81/00312

§ 371 Date: Jun. 24, 1982

§ 102(e) Date: Jun. 24, 1982

[87] PCT Pub. No.: WO82/01604

PCT Pub. Date: May 13, 1982

[30] Foreign Application Priority Data

Oct. 30, 1980 [JP] Japan .................................. 55-151454

[51] Int. Cl.³ .............................................. G05B 23/02
[52] U.S. Cl. .................................... 318/565; 318/567; 318/600; 364/167
[58] Field of Search ....................... 318/565, 567–569, 318/574, 600, 601; 364/167

[56] References Cited

U.S. PATENT DOCUMENTS

| | | | |
|---|---|---|---|
| 3,934,186 | 1/1976 | Hayakawa et al. | 318/567 |
| 4,021,650 | 5/1977 | Ruble | 318/569 X |
| 4,090,120 | 5/1978 | Leenhouts | 318/567 |
| 4,130,787 | 12/1978 | Allaire et al. | 318/565 |
| 4,160,198 | 7/1979 | Brömer | 318/565 |
| 4,280,182 | 7/1981 | Mickowski | 318/567 X |

Primary Examiner—B. Dobeck
Attorney, Agent, or Firm—Armstrong, Nikaido, Marmelstein & Kubovcik

[57] ABSTRACT

A numerical control apparatus for a machine tool (4) comprises a transmitting circuit (43) for transmitting each block of machining information to an abnormal operation monitoring apparatus (6), which comprises a receiving circuit (61) for receiving each of said blocks of machining information and a decoding circuit (63) for decoding the content of said received blocks of machining information, thereby, as the machining proceeds by each one block, data indicating the content of said block and a signal indicating the termination of execution of the machining operation defined in said block are supplied from said numerical control apparatus (4) to said abnormal operation monitoring apparatus (6) and said content of each block of machining information is decoded in said abnormal operation monitoring apparatus (6).

1 Claim, 2 Drawing Figures

NUMERICAL CONTROL APPARATUS FOR MACHINE TOOLS

TECHNICAL FIELD

The present invention relates to a numerical control apparatus for machine tools, more particularly to a numerical control apparatus for machine tools, which comprises a transmitting circuit for successively transmitting blocks of machining information to an abnormal operation monitoring apparatus.

BACKGROUND ART

Machine tools controlled by numerical control apparatus ordinarily are provided with apparatus for monitoring abnormal operations in the tool. The abnormal operation monitoring apparatus must, when monitoring, discriminate which tool is actually performing the machining. Information necessary for discrimination of tools is instructed into the numerical control (NC) tape in the form of tool change signals (M code), tool number signals (T code), and the like.

NC tapes record machining information in blocks comprising single performance instructions including position instructing signals (X code, Y code, Z code, and the like), a rotation speed instructing signal (S code), a tool change signal (M code), a tool number signal (T code), and the like.

The system used for supplying tool information from a numerical control apparatus to an abnormal operation monitoring apparatus according to the conventional technique is shown in FIG. 1. In the numerical control apparatus 1 of FIG. 1, the T code of one block of machining information is decoded and outputted as the BCD signal, for example, by operation of relay contacts. Supposing that the T code is expressed by, for example, the two digit number T02, only one signal $T_{12}$ is put ON among the contact signals $T_{28}$, $T_{24}$, $T_{22}$, $T_{21}$, $T_{18}$, $T_{14}$, $T_{12}$, and $T_{11}$, and the other contact signals are put OFF. These contact signals are supplied to the abnormal operation monitoring apparatus 3. In the abnormal operation monitoring apparatus 3, a receiving circuit 31 receives the T code contact signals and supplies them to a T code processing circuit 32. The T code processing circuit 32 decodes the supplied T code signals, discriminates the selected tool, and supplies the tool discrimination signal to a selected tool processing circuit 33. The selected tool processing circuit 33 supplies the data necessary for detecting the abnormal operation in the tool to an abnormal operation detecting circuit 34. The abnormal operation detecting circuit 34 compares the operation data from the machine tool 2 with the above-mentioned data for detecting the abnormal operation in the tool so as to detect whether or not there is an abnormal operation in the tool.

However, conventional numerical control apparatus suffer from the problem that when remodeling an existing installation to provide it with a tool abnormal operation monitoring apparatus, it is necessary to design the circuit construction of the abnormal operation monitoring apparatus, the processing of the abnormal operation detecting data, and the like, individually for each installation. This design work is very troublesome.

DISCLOSURE OF THE INVENTION

The main object of the present invention is to solve the above problem of the conventional technique and provide a numerical control apparatus for machine tools based on the idea of providing the numerical control apparatus with a transmitting circuit for successively transmitting blocks of machining information to an abnormal operation monitoring apparatus and providing the abnormal operation monitoring apparatus with a receiving circuit for successively receiving each block of the machining information and a decoding circuit for decoding contents of the received blocks of the machining information, wherein all the tool discriminating information can be transmitted from the numerical control apparatus to the abnormal operation monitoring apparatus, and the monitoring system for abnormal operation in the tool can be applied to all machine tools without remodeling thereof.

In accordance with the present invention, there is provided a numerical control apparatus for a machine tool, which comprises a transmitting circuit for successively transmitting blocks of machining information to an abnormal operation monitoring apparatus, said abnormal operation monitoring apparatus comprising a receiving circuit for successively receiving each of said blocks of machining information and a decoding circuit for decoding the content of said received blocks of machining information, whereby, as the machining proceeds by each one block, data indicating the content of said block and a signal indicating termination of execution of the machining operation defined in said block are supplied from said numerical control apparatus to said abnormal operation monitoring apparatus and said content of each block of machining information is decoded in said abnormal operation monitoring apparatus.

BEST MODE FOR CARRYING OUT THE INVENTION

Figure 1:
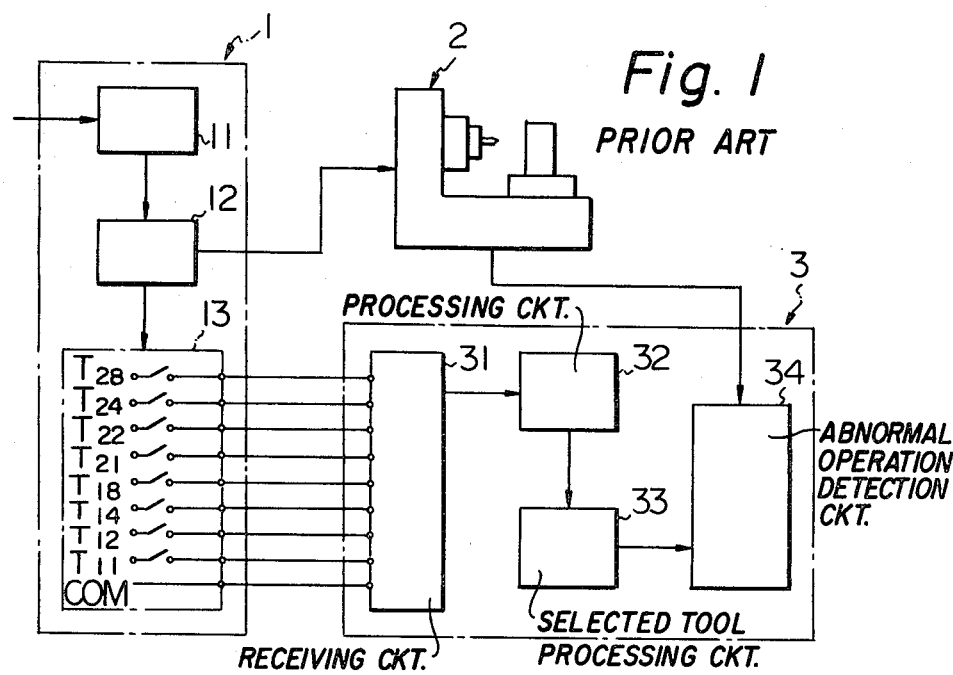
FIG. 1 illustrates a block circuit diagram of a tool abnormal operation monitoring system using a conventional numerical control apparatus for a machine tool.
Figure 2:
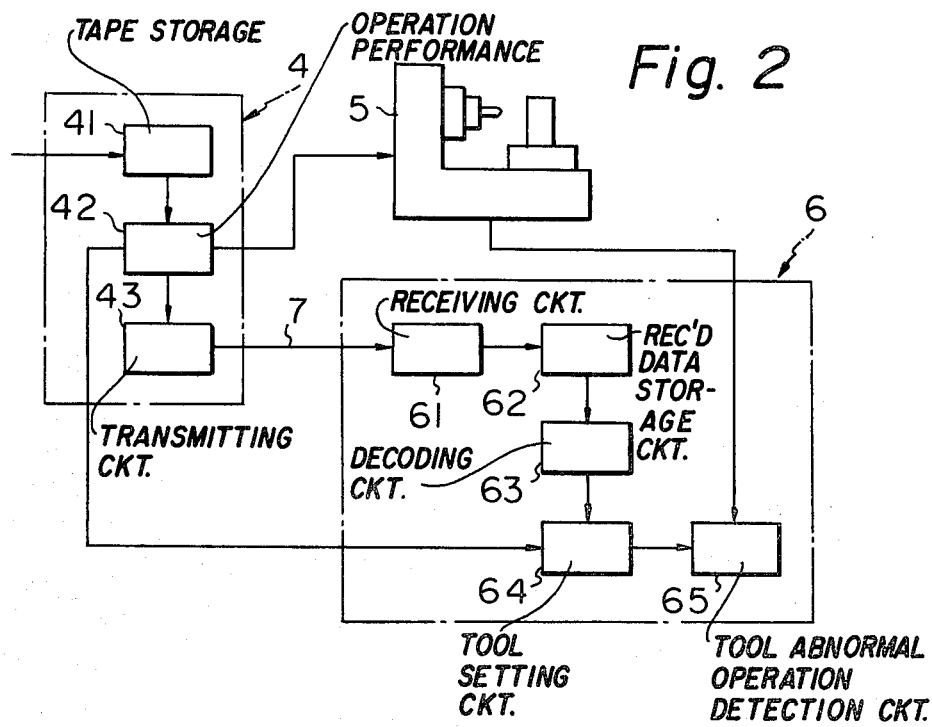
FIG. 2 illustrates a block circuit diagram of a tool abnormal operation monitoring system using a numerical control apparatus for a machine tool in accordance with one embodiment of the present invention.

A numerical control apparatus for a machine tool in accordance with one embodiment of the present invention is illustrated in FIG. 2. In FIG. 2, a numerical control apparatus 4, a machine tool 5, and an abnormal operation monitoring apparatus 6 are shown.

The numerical control apparatus 4, machining information from an NC tape is stored in an NC tape storage device 41. An operation-performing device 42 controls the machine tool 5 based on the stored machining information so that the machining operation defined in the machining information is put into effect block by block. The operation-performing device 42 also successively supplies each block of machining information to a transmitting circuit 43. The transmitting circuit 43 successively transmits each block of the machining information to the abnormal operation monitoring apparatus 6 through the transmission line 7. In the abnormal operation monitoring apparatus 6, each block of the machining information successively transmitted from the numerical control apparatus 4 is received by the receiving circuit 61. The receiving circuit 61 supplies the received block of the machining information to a received data storage circuit 62. The received data storage circuit 62 supplies each one block of the stored machining information to a block content decoding circuit 63. The block content decoding circuit 63 decodes the one block of the machining information, discriminates the selected tool, and supplies the selected tool information to a tool setting circuit 64.

A signal indicating the termination of the machining operation defined in one block is also supplied to the tool setting circuit 64 from the numerical control apparatus 4, thereby the data of the tool being used in that instant is set in the tool setting circuit 64. Based on the above-mentioned set tool data, the tool setting circuit 64 supplies the data necessary for detecting an abnormal operation in the tool to a tool abnormal operation detecting circuit 65. The tool abnormal operation detecting circuit 65 compares the operation data from the machine tool 5 with the above-mentioned data for detecting an abnormal operation in the tool and detects whether an abnormal operation in the tool exists.

In accordance with the abnormal operation monitoring apparatus 6, tools which are broken or worn out abnormally or tools with an expired life can be discriminated.

According to the present invention, there can be provided a numerical control apparatus for a machine tool wherein all the tool discrimination information can be transmitted from the numerical control apparatus to the abnormal operation monitoring apparatus, and the monitoring of abnormal operation in the tool can be effected for all machine tools without remodeling thereof.

We claim:

1. A numerical control system for controlling a tool, comprising:
   a numerical control device for controlling said machine tool in accordance with one performance instruction including at least a tool number code of said machine tool; and
   a tool abnormal operation monitoring device for monitoring whether or not the tool of said machine tool is abnormal,
   wherein said numerical control device comprises means for transmitting said entire performance instruction to said tool abnormal operation monitoring device and means for transmitting a signal indicating the termination of execution of said performance instruction to said tool abnormal operation monitoring device, and
   wherein said tool abnormal operation monitoring device comprises:
   means for receiving and storing said performance instruction;
   means for decoding said tool number information from said performance instruction stored in said receiving and storing means; and
   means for reading said tool number code from said decoding means in response to said execution termination signal and for comparing said tool number code with operation data from said machine tool to detect whether or not the tool of said machine tool is abnormal.

* * * * *